Oct. 27, 1970 G. E. GOODE ET AL 3,536,823

COLOR DISPLAY SYSTEM

Filed June 5, 1967 4 Sheets-Sheet 1

Oct. 27, 1970 G. E. GOODE ET AL 3,536,823

COLOR DISPLAY SYSTEM

Filed June 5, 1967 4 Sheets-Sheet 3

Oct. 27, 1970 | G. E. GOODE ET AL | 3,536,823

COLOR DISPLAY SYSTEM

Filed June 5, 1967 | 4 Sheets-Sheet 4

United States Patent Office 3,536,823

Patented Oct. 27, 1970

3,536,823

COLOR DISPLAY SYSTEM

George E. Goode, Harry F. Cooke, and Donald B. Hall, Richardson, Tex., assignors to Texas Instruments Incorporated, Dallas, Tex., a corporation of Delaware Filed June 5, 1967, Ser. No. 643,530
Int. Cl. H04n 9/24
U.S. Cl. 178—5.4 4 Claims

ABSTRACT OF THE DISCLOSURE

A color display system is disclosed in which a beam of electrons from an electron gun is scanned across a viewing screen upon which phosphors emitting light of different colors are disposed in alternating stripes. The screen also includes a series of index stripes, interleaved with the phosphor stripes, for providing an indexing signal. The indexing signal so generated is employed to control or time the sequential application of different color signals and a preselected D.C. bias to the electron gun so that the color signals produce image components in respective colors. The preselected D.C. bias causes the indexing signal generated to be of substantially uniform amplitude and the uniform amplitude of the indexing signal in turn facilitates highly accurate timing of the gated color signals in relation to the scanning of the phosphor stripes so that good color purity is obtained.

This invention relates to a color display system and more particularly to such a system wherein a plurality of image components of different colors are produced in response to respective color signals.

It has previously been proposed to dispose phosphors which emit light of different colors in parallel alternating stripes and to then index a beam of electrons across the screen while modulating the beam intensity with respective color signals as the beam traverses the different stripes. It has also been proposed to use separate index stripes to obtain a timing signal which fluctuates as the beam traverses the screen. However, the signals as obtained in such prior art systems have suffered from intermodulation distortion caused by the video signal or have required complex frequency separation methods to isolate the timing signal from the video information and thus it has been difficult to obtain good color purity.

Among the several objects of the present invention may be noted the provision of a color display system which provides an image including a plurality of image components of different colors produced in response to respective color signals; the provision of a beam-indexing color display system in which a multiplicity of stripes of each of a plurality of different phosphors are successively excited by an electron beam and in which the beam is modulated by respective color signals in synchronism with the sequence in which the phosphor stripes are traversed by the beam; the provision of such a display system including means for providing an index signal of constant amplitude for controlling the sequence of modulation of the beam; the provision of such a color display system which provides an image of high color purity; and the provision of such a system which is highly reliable. Other objects and features will be in part apparent and in part pointed out hereinafter.

Briefly, a color display system according to the present invention is operative to provide an image including a plurality of image components of different colors produced in response to respective color signals. The images are produced on a viewing screen including a multiplicity of stripes of each of a plurality of different phosphors, which phosphors emit light of different colors when excited by impinging electrons. The screen includes also a series of index stripes interleaved with the phosphor stripes for providing an indexing signal when struck by impinging electrons. The screen is scanned with a beam of electrons from an electron gun thereby to energize the phosphors and to produce an indexing signal. Means are provided for generating a preselected sequence of timed gating signals in response to the indexing signal and the gating signals control respective gate means for sequentially applying the color signals and then a preselected D.C. bias to the gun, the sequence of application corresponding to the order in which the phosphor stripes and the index stripes are positioned on the screen. Accordingly, the color signals produce image components in respective colors under control of an index signal which is of substantially uniform amplitude thereby providing accurate timing of the gating signals in relation to the scanning of the beam across the screen.

Corresponding reference characters indicate corresponding parts throughout the several views of the drawings.

Figure 1:
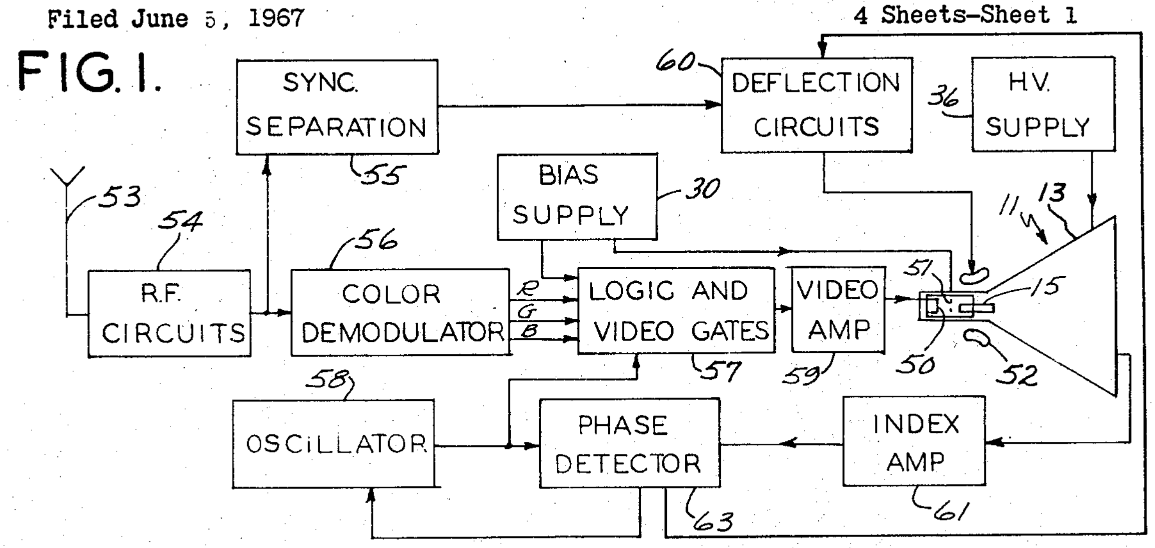
FIG. 1 is a block diagram of a color display system according to this invention.

The color display system illustrated in FIG. 1 employs a kinescope 11 comprising a viewing screen 13 and an electron gun 15. Deposited on screen 13 are a multiplicity of vertical stripes of phosphors which emit light of different colors when excited by impinging electrons. A small section of screen 13 is represented at A in FIG. 3 and, as may be seen, includes a series of phosphor stripes 25 which emit red light and a series of phosphor stripes 27 which emit green light and a series of phosphor stripes 29 which emit blue light. The different series are interleaved so that the stripes producing light of different colors alternate in a regular or repeated sequence.

Figure 2:
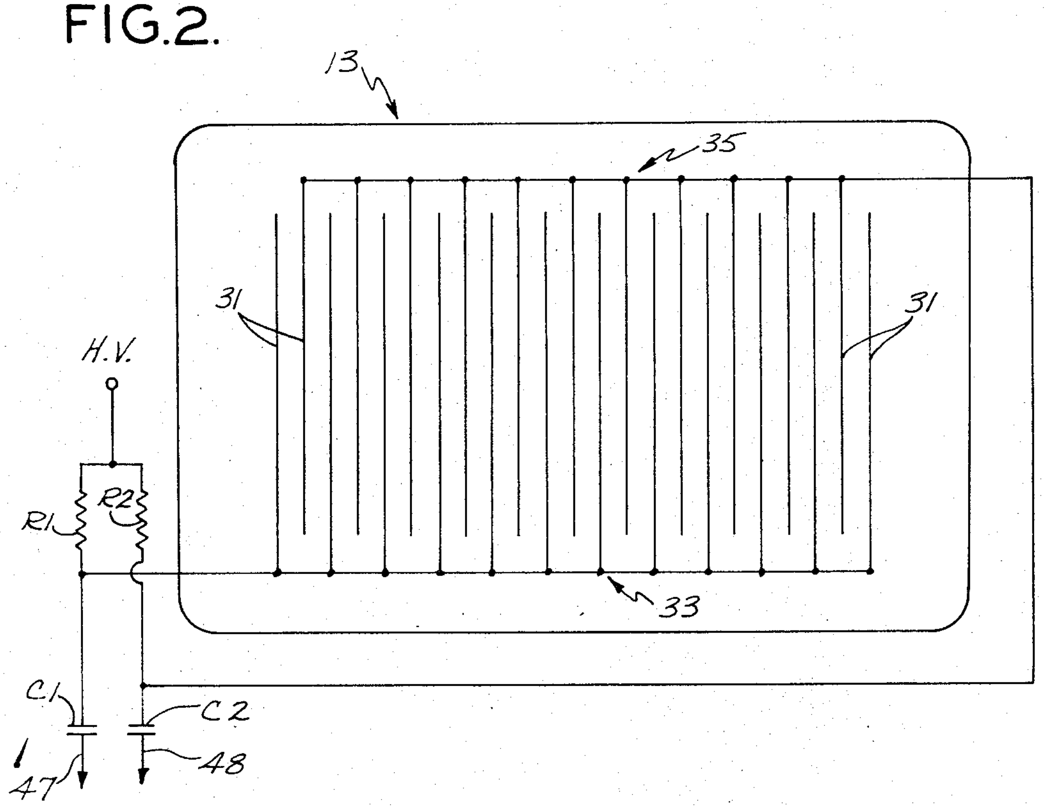
FIG. 2 is a front elevation of a viewing screen employed in the system of FIG. 1 diagrammatically showing index stripes incorporated therein.

Interleaved with the phosphor stripes are a series of index stripes 31 which may, for example, comprise strips of a conductive material such as aluminum. Alternate stripes 31 are connected together along opposite edges of the screen as illustrated in FIG. 2 so as to comprise a pair of inter-leaved comb-like structures 33 and 35. A relatively-high electron accelerating voltage is applied to the screen 13 from a regulated high voltage supply 36 (FIG. 1). This high voltage is preferably applied to the comb-like structures 33 and 35 through respective isolating resistances R1 and R2 so that a differential signal can be developed therebetween. Signals developed on the structures 33 and 35 are applied to a pair of leads 47 and 48 through respective D.C. blocking capacitors C1 and C2.

Gun 15 is essentially conventional and includes an electron emissive cathode 50 and a grid 51. As is understood by those skilled in the art, gun 15 is operative to emit a beam of electrons directed toward screen 13. The beam is accelerated by the high voltage applied to screen 13 and the intensity of the beam is variable as a function of the voltage applied between cathode 17 and the grid 19.

The beam of electrons emitted by gun 15 is subjected to the deflecting influence of magnetic fields generated by a conventional deflection yoke 52. Yoke 52 is energized, as is explained in greater detail hereinafter, to scan the beam of electrons over screen 13 in a raster comprising a series of horizontal lines. The beam is thus scanned transversely across the various phosphor stripes 25, 27 and 29 and the index stripes 31 in succession.

The system illustrated in FIG. 1 is arranged for receiving color television broadcasts, for example, those transmitted according to conventional NTSC standards. Transmitted signals received at an antenna 53 are suitably amplified and detected by R.F. circuits indicated at 54. These R.F. circuits form no part of the present invention and are not described in detail herein. The detected modulation is applied to sync separator circuits indicated generally at 55 and to color signal demodulator circuits indicated generally at 56. The sync separator circuits 55 control the operation of deflection circuits 60 which energize yoke 52 to obtain the raster scanning of the electron beam emitted by gun 15 as described previously. The color demodulator circuits 56 decode or separate the composite video signal into three component color signals each of which represents an image component of a respective color, e.g., red, green and blue.

The red, green and blue color signals are supplied to logic and video gate circuitry which is indicated generally at 57. Preselected D.C. bias voltages are provided to the circuitry 57 and to the grid 51 of the kinescope electron gun 15 by a supply indicated generally at 30.

The logic and video gate circuitry 57 is operated under the control of a signal provided by a variable frequency oscillator circuit 58 to pass a selected one of the red, green and blue color signals or the preselected D.C. bias voltage to a high level video amplifier 59. Video amplifier 59 drives the cathode 50 of electron gun 15 so that the beam of electrons emitted by the gun is modulated in succession by the different color signals and the D.C. bias voltage.

As the beam of electrons emitted by gun 15 is scanned across the screen 15 by yoke 52, a pulsating signal is developed on each of the comb-like structures of index stripes. These pulsating signals are applied to an index amplifier 61 which, for the purpose of noise reduction as described hereinafter, is preferably of the differential input type. The amplified index signal and the output signal from oscillator circuit 58 are applied to a phase detector circuit 63. The output voltage from phase detector 63 varies in amplitude as a function of the relative phase displacement between the oscillator output signal and the amplified index signal. A fuse error signal from the phase detector is then fed back to the oscillator circuit 58 to vary its frequency. This final error signal is applied in a sense or polarity which tends to phase lock the oscillator output signal to the index signal as described in greater detail hereinafter. Although not essential to the basic operation of the system, a second error signal from the phase detector may also be applied to the deflection circuit 60 as an aid in stabilizing the sweep amplitude.

When the oscillator output signal is phase locked or synchronized with the index signal, the logic and video gate circuitry 57 operates to apply the different color signals and the D.C. bias level to the video amp 59 in sequence and with the proper timing so that each of the amplified signal portions is applied to the cathode 50 of gun 15 just as the electron beam crosses the respective phosphor or index stripe. During the application of the pre-set voltage for index-beam bias, the gating signals (XII, XIII and XIV in FIG. 5) prevent the transmission of video information to the video amplifier, and thus to the gun. Therefore, no video information can be present to interfere with the beam current determined by the pre-set voltage for index-beam bias.

Figure 4:
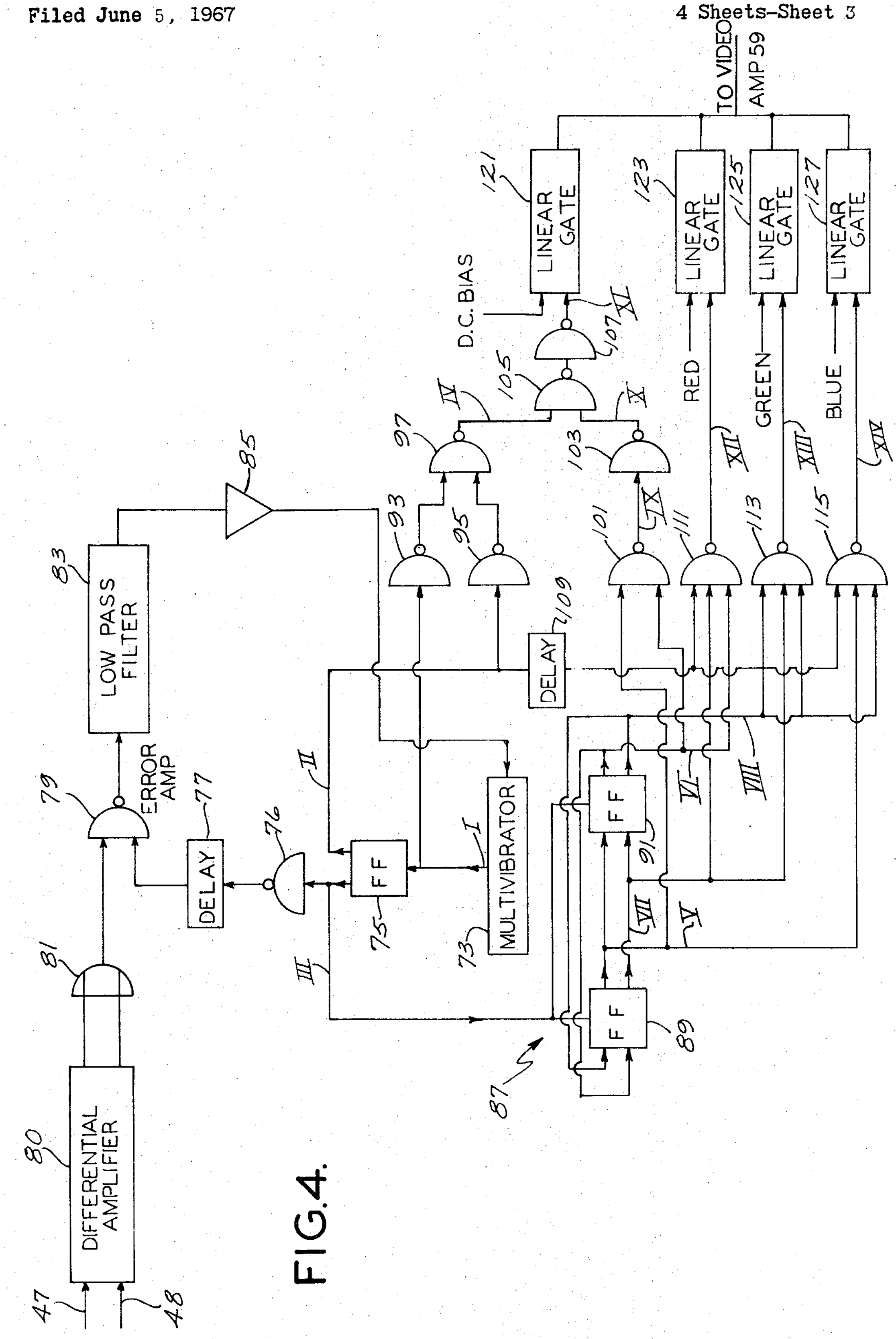
FIG. 4 is a block diagram of indexing, logic and gating circuits employed in the system of FIG. 1.
Figure 5:
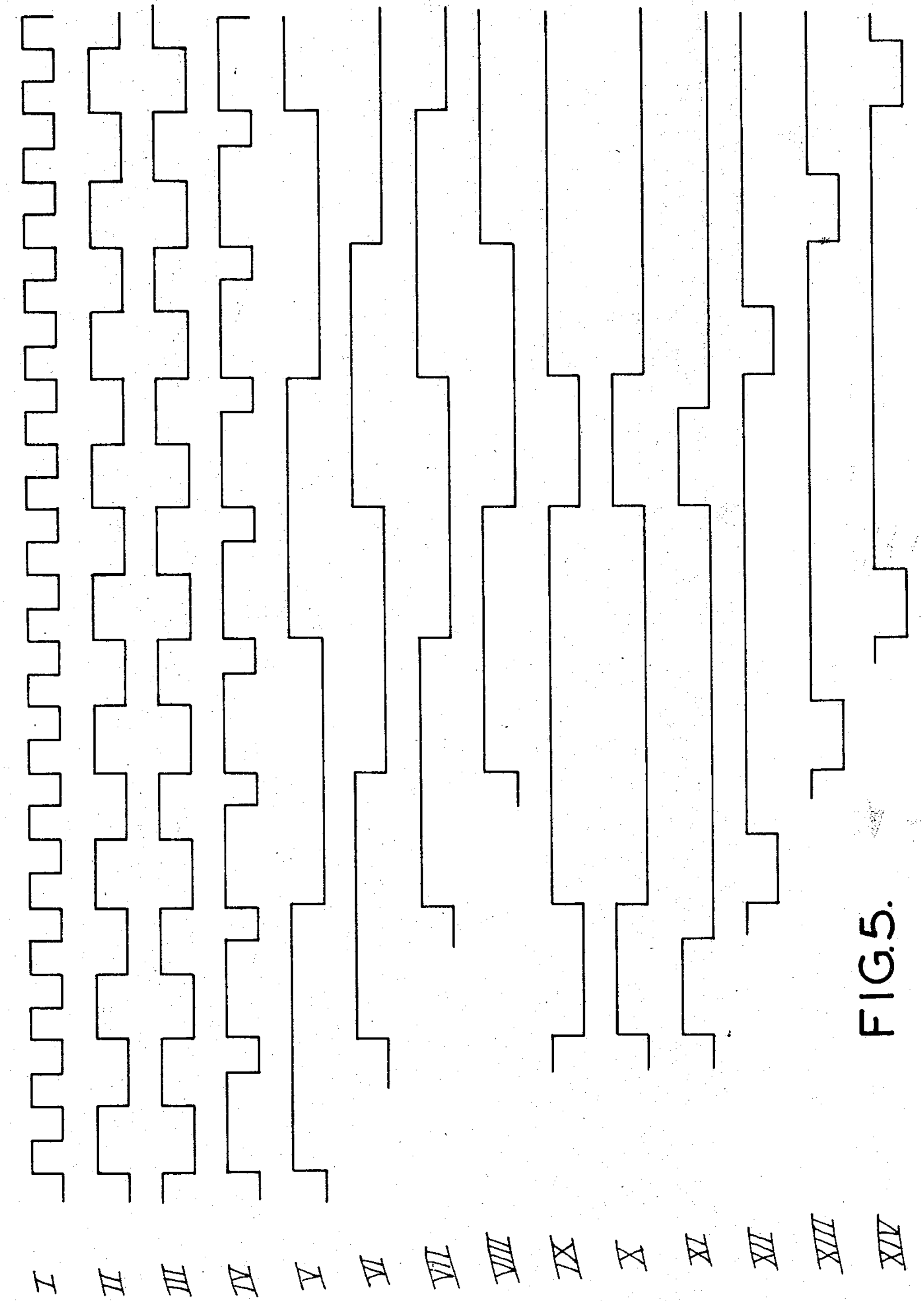
FIG. 5 is a chart representing various signals occurring within the circuits illustrated in FIG. 4, the correspondence between the signals and the points in the circuits at which they occur being indicated by the use of the same roman numeral.

The index signal amplifier phase detector, oscillator and the logic and video gate circuits (61, 63, 58 and 57 respectively) are illustrated in greater detail in FIG. 4 and the operation of this circuitry may be understood with reference to the wave forms represented in FIG. 5. The oscillator 58 preferably comprises an astable multivibrator 73, the frequency of oscillation of which may conveniently be adjusted by varying a bias voltage applied thereto. In order to provide a timing unit which is appropriate for the logic circuitry described hereinafter, multivibrator 73 is preferably operated at a frequency which is at least twice that at which the individual index and phosphor stripes 25, 27, 29 and 31 are swept by the electron beam. The multivibrator output signal is represented at I in FIG. 5. The output signal from oscillator 73 is applied to a flip-flop circuit 75 to obtain two-out-of-phase signals (II and III) at half the multivibrator frequency. One of these latter signals (III) is applied, through a NAND gate 76 and an adjustable delay circuit 77, to one input of a NAND gate 79 which comprises a part of the phase detector 63.

Each of the comb-like index stripe structures 33 and 35 provides a signal which pulsates at half the frequency at which the individual index stripes 31 are traversed by the electron beam. These pulsating signals are applied to respective input terminals of a differential amplifier 80 of the type which provides a pair of out-of-phase output signals having amplitudes which are substantially proportional to the difference between the input signals. As is understood by those skilled in the art, such a differential amplifier is quite sensitive to out-of-phase voltages applied to the two input leads and is quite insensitive to in-phase signals. As the comb-like structures 33 and 35 will typically exhibit substantial capacitive coupling to their environment, they will typically pick up appreciable electronic noise, which noise may exceed the desired index signal in amplitude. However, since the two comb-like structures 33 and 35 will typically pick up such noise signals equally and in phase, these noise signals are cancelled in the differential amplifier 80 and only the desired pulsating index signals are transmitted to the output signals provided by the amplifier.

The out-of-phase output signals from differential amplifier 80 are applied to an OR gate 81 to obtain a signal which pulsates at a frequency equal to that at which individual index stripes 31 are scanned by the electron beam. The output signal from OR gate 81 is applied to the other of the two inputs of the phase detector NAND gate 79. The output signal from the NAND gate 79 is applied to a low pass filter 83 and the essentially D.C. signal passed by filter 83 is amplified at 85 and is applied to the oscillator 73 to control its frequency.

The output signal III from flip-flop 75 is also applied to clock or trigger a so-called Johnson counter 87 comprising a pair of flip-flops 89 and 91 which are interconnected to provide four stable states in sequence, each of the states being uniquely identified by a particular combination of output signals from the two flip-flops 89 and 91. The output singals from the counter flip-flops are represented at V, VI, VII and VIII in FIG. 5.

The output signal II from the flip-flop 75 and the oscillator output signal I are passed through respective NAND gates 93 and 95 and are then combined in a NAND gate 97 to provide a signal having a timing as represented at IV in FIG. 5. The output signals V and VI provided from the Johnson counter flip-flops 89 and 91 are combined in a NAND gate 101 and inverted in a NAND gate 103 and the resultant signal (X) is combined with the signal IV in a NAND gate 105. The output signal from gate 105 is further inverted in a NAND gate 107 to provide a signal as represented at XI in FIG. 5.

The output signal II from the oscillator flip-flop 75 is subjected to an adjustable delay by means of a circuit indicated at 109 and this delayed signal is combined with the output signals from the Johnson counter flip-flops 89 and 91 in various combinations in the NAND gates 111, 113 and 115 to provide the signals having timings as represented at XII, XIII and XIV respectively in FIG. 5.

The output signals from the NAND gates 107, 111, 113 and 115 constitute gating signals for the D.C. bias and the three color signals respectively and are applied to respective video linear gate circuits 121, 123, 125 and 127. These gates are thereby operated to selectively pass the D.C. bias or the red, green or blue color signals in succession to the video amplifier 59. Assuming that proper phasing or timing is obtained, the D.C. bias and the red, green and blue color signals are applied to modulate the electron beam intensity just as the beam sweeps over the index stripe and the red, green and blue phosphor stripes respectively and thus each of the color signals will cause light of an appropriate color to be generated.

The proper phasing or timing is maintained substantially as follows, reference being had to FIG. 3 in which the time relationships between various signals and the scanning of the index stripes by the electron beam are illustrated. The gating pulse (XI in FIG. 5) which controls the application of the D.C. bias to gun 15 is represented at B in FIG. 3 as having its normal or desired phase relationship to the scanning of the index stripes 31. As may be seen, the duration of this gating pulse is greater than the time required to sweep the full width of one of the index stripes 31. Further, the stripes 31 are positioned in relation to the phosphor stripes 25, 27 and 29 so that the portion of the sweep of the electron beam which is at the constant bias level overlaps the index stripe on both sides. The phasing of the indexing signal obtained from the index stripes through the index amplifier 61 and the OR gate 89 thus depends substantially wholly upon the timing of the electron beam sweep as it crosses the index stripe and is essentially independent of the timing of the gating pulse signal B. The indexing signal so obtained is represented at C in FIG. 3, it being understood that, at the frequencies involved, the sharply switched wave form represented in the drawings is not actually obtained.

Figure 3:
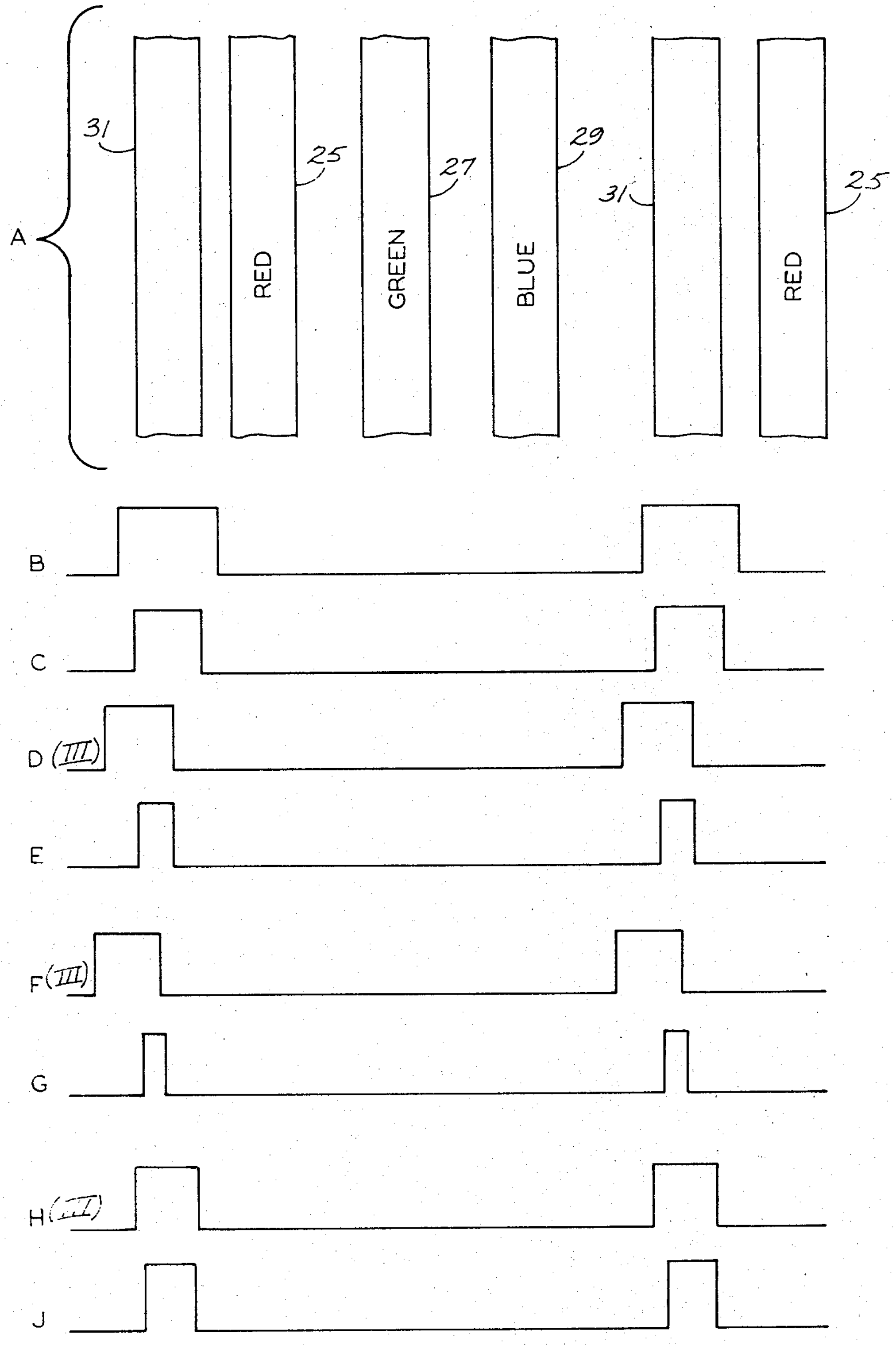
FIG. 3 is a diagram illustrating the method by which an oscillator employed in the system of FIG. 1 is synchronized with the sweeping of a beam of electrons across the screen of FIG. 2.

The oscillator output signal (III from FIG. 5) is shown at D in FIG. 3 in proper timed relationship to the gating pulse signal B which is derived from the oscillator. The combination of the signals B and C in the phase detector NAND gate 79 thus produces a signal as represented at E in FIG. 3. As is understood by those skilled in the art, a pulse signal such as E has a D.C. component which is substantially proportional to the pulse duration.

If the phase of the multivibrator shifts so that the various gated signals are applied to the electron gun 15 slightly early in relation to the scanning of the respective stripes, the multivibrator output signal III also shifts or advances in phase as indicated at F in FIG. 3. As the phase of the index signal is determined by the sweep of the electron beam across the index stripes 31 rather than upon the phase of the multivibrator, there is thus a relative phase shift between the two input signals to the NAND gate 79 and the width of the pulses passed by that gate are correspondingly reduced as represented at G in FIG. 3. The D.C. component of the gate output signal is thus also reduced. Conversely, if the phase of the multivibrator shifts so that the various pulse signals generated by the oscillator are delayed and the gating of the different signals applied to gun 15 is late with respect to the sweep of the electron beam, the oscillator output signal III will also be delayed as represented at H in FIG. 3 and the output signal from the phase detector NAND gate 79 will thus be a pulse of longer duration having an increased D.C. component as represented at J in FIG. 3.

The low pass filter 83 (FIG. 4) passes only the D.C. component of the output signal from the phase detector NAND gate 79 and it can thus be seen that this D.C. signal varies as a function of the phase relationship of the oscillator output signal and the sweeping of the index stripes 31 by the electron beam. This D.C. signal is amplified by amplifier 85 and is applied to oscillator 73 in a sense tending to correct any displacement from the desired phase relationship. A phase locked relationship between the output of the oscillator and the sweeping of the electron beam across the index stripes is thereby maintained. As non-linearity of the sweep of the electron beam and so-called pincushion distortion may cause the lineal rate of scan of the electron beam across the viewing screen 13 to vary from area to area on the screen, it is desirable that the spacing of the stripes be selected for each portion of the screen so that the frequency at which the index stripes are scanned remains relatively constant across the viewing screen. In this way the bandwidth and gain requirements of the phase-lock loop just described will be minimized thereby further assuring synchronism between the application of the color signals to gun 15 and the scanning of the respective phosphor stripes.

Since the intensity of the electron beam is modulated to a constant level for a period substantially longer than the time required to sweep an individual index stripe, it can be seen that the amplitude of the index signal is relatively unaffected by nominal or incipient shifts in the phase of oscillator 73. Similarly, since the color signals are cut off during this interval, the indexing signal is not cross-modulated by the color signals. Accordingly, a very precise phase synchronism can be maintained which insures that production of light of each color will be in response only to the respective color signal. The resultant composite color image will thus exhibit a high degree of color purity.

Since the majority of the components of the oscillator, phase detector and logic and heating circuits operate in a switching mode, it will be seen by those skilled in the art, that a system according to the present invention may be constructed employing integrated switching or logic circuits of the type which have been highly developed for use in digital computers and which are readily adapted to construction in integrated circuit form.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A color display system for providing an image including a plurality of image components of different colors produced in response to respective color signals, said system comprising:

a viewing screen including a first series of stripes of a phosphor which emits light of a first color, a second series of stripes of a phosphor which emits light of a second color, a third series of stripes of a phosphor which emits light of a third color, and a series of conductive stripes, said stripes being interleaved and arranged in a regular repeated sequence across said screen;

means including an electron gun for scanning said screen with a beam of electrons in a scanning raster comprising a series of generally parallel lines extending transversely to said stripes thereby to successively energize said phosphors and to produce an index signal on said conductive stripes;

means including a variable oscillator for providing a signal of adjustable frequency;

means including a phase detector for phase locking said adjustable frequency signal with said indexing signal;

means including counter means having at least four states for generating a preselected sequence of timed gating signals; and at least four gate means controlled by said gating signals for passing respective ones of said color signals and a D.C. bias level to said gun for modulating the intensity of said beam of electrons in sequence whereby said phosphors are energized in response to respective ones of said color signals and said index stripes provide an index signal of substantially uniform amplitude for synchronizing said adjustable frequency and gating signals with the scanning of said beam across said screen.

2. A color display system for providing an image including a plurality of image components of different colors produced in response to respective color signals, said system comprising:

a view screen including a multiplicity of stripes of each of a plurality of different phosphors, the different phosphors emitting light of different colors when excited by impinging electrons, said screen including also index stripe means interleaved with said phosphor stripes for providing an indexing signal when struck by impinging electrons, said screen including also index stripe means interleaved with said phosphor stripes for providing an indexing signal when struck by impinging electrons;

means including an electron gun for scanning said screen with a beam of electrons thereby to energize said phosphors and to produce an indexing signal;

means responsive to said indexing signal, including an astable multivibrator tuned to operate at substantially twice the frequency at which said index stripes are scanned by said electron beam and a flip-flop connected to halve the frequency of said multivibrator, for generating a preselected frequency of timed gating signals; and gate means responsive to said gating signals for sequentially applying said color signals and then a preselected D.C. bias to said gun, the sequence corresponding to the order in which said phosphor stripes and said index stripe means are positioned on said screen whereby said signals produce image components in respective colors under control of an indexing signal of substantially uniform amplitude which provides accurate timing of said gating signals in relation to the scanning of said beam across said screen.

3. A color display system for providing an image including a plurality of image components of different colors produced in response to respective color signals, said system comprising:

a viewing screen including a multiplicity of stripes of each of a plurality of different phosphors, arranged in a regular repeated sequence across said screen, the different phosphors emitting light of different colors when excited by impinging electrons, said screen including also index stripe means interleaved with said phosphor stripes for providing an indexing signal when struck by impinging electrons, every other one of said conductive stripes being connected together along one edge of said screen and the alternate conductive stripes being connected together along the opposite edge of said screen to provide a pair of interleaved comblike structures;

means including an electron gun for scanning said screen with a beam of electrons thereby to energize said phosphors and to impinge upon the index stripe means and produce an indexing signal;

means including a differential amplifier having one of its inputs connected to one of the comblike structures and the other input connected to the other comblike structure, responsive to said indexing signal for generating a preselected sequence of time gating signals; and gate means responsive to said gating signals for sequentially applying said color signals and then a preselected D.C. bias to said gun, the sequence corresponding to the order in which said phosphor stripes and said index stripe means are positioned on said screen whereby said signals produce image components in respective colors under control of an indexing signal of substantially uniform amplitude which provides accurate timing of said gating signals in relation to the scanning of said beam across said screen.

4. A color display system for providing an image including a plurality of image components of different colors produced in response to respective color signals, said system comprising:

a viewing screen including a multiplicity of stripes of each of a plurality of different phosphors, the different phosphors emitting light of different colors when excited by impinging electrons, said screen including also index stripe means interleaved with said phosphor stripes for providing an indexing signal when struck by impinging electrons;

means including an electron gun for scanning said screen with a beam of electrons thereby to energize said phosphors and to produce an indexing signal;

means responsive to said indexing signal, including a counter having at least four states, for generating a preselected sequence of timed gating signals; and gate means responsive to said gating signals, including at least four gate circuits operated during respective ones of the four states of said counter, for sequentially applying said color signals and then a preselected D.C. bias to said gun during the operation of respective ones of said gate circuits, the sequence corresponding to the order in which said phosphor stripes and said index stripe means are positioned on said screen whereby said signals produce image components in respective colors under control of an indexing signal of substantially uniform amplitude which provides accurate timing of said gating signals in relation to the scanning of said beam across said screen.

References Cited

UNITED STATES PATENTS

| | | |
|---|---|---|
| 2,657,331 | 10/1953 | Parker. |
| 2,841,644 | 7/1958 | Biggs. |
| 3,201,510 | 8/1965 | Davidse. |

RICHARD MURRAY, Primary Examiner

A. H. EDDLEMAN, Assistant Examiner